(No Model.)
C. A. FAURE.
INCLOSING CELL FOR ELECTRIC BATTERIES.
No. 366,717. Patented July 19, 1887.
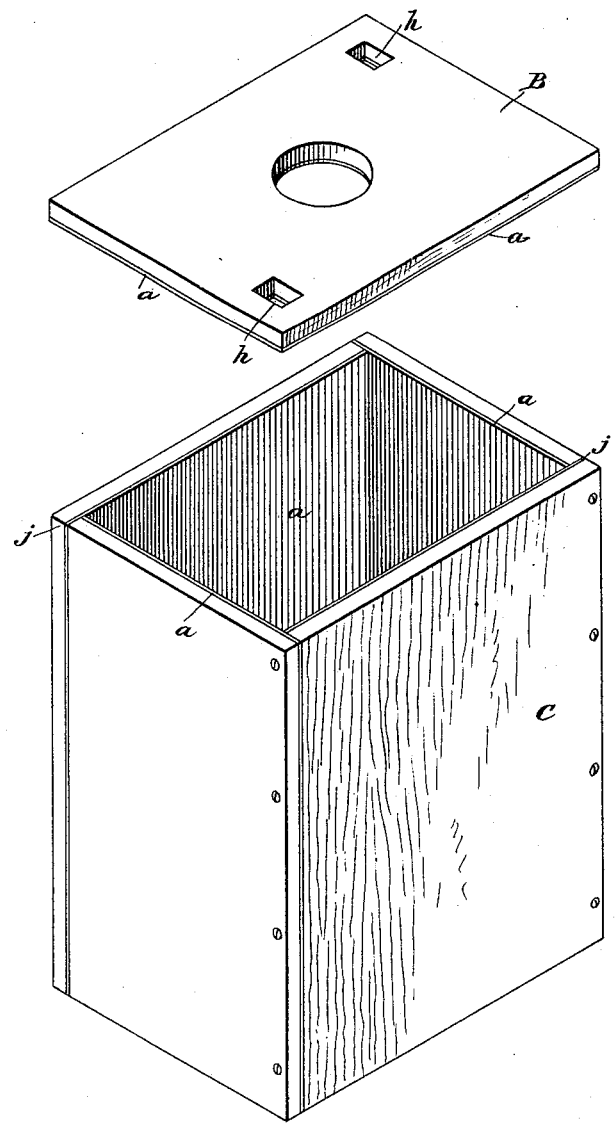

UNITED STATES PATENT OFFICE.

CAMILLE A. FAURE, OF NEW YORK, N. Y., ASSIGNOR TO THE ELECTRICAL ACCUMULATOR COMPANY, OF NEW YORK.

INCLOSING-CELL FOR ELECTRIC BATTERIES.

SPECIFICATION forming part of Letters Patent No. 366,717, dated July 19, 1887.

Application filed April 1, 1887. Serial No. 234,162. (No model.)

*To all whom it may concern:*

Be it known that I, CAMILLE A. FAURE, a citizen of the Republic of France, temporarily residing in New York city, in the county of New York and State of New York, have invented certain new and useful Improvements in Inclosing-Cells for Electric Batteries, of which the following is a specification.

My invention consists of an improvement in the construction of the inclosing-cells for secondary batteries.

My object is to provide an acid-proof cell of sufficient mechanical strength to permit of transporting the plates or elements in position in the cell without injury to the walls thereof.

In the construction of my cell I take an acid-proof insulating compound of which oil and resin are essential elements, but which may be combined with some fibrous substance. I have obtained good results with a compound of this nature known to the trade and herein designated as "adamanta." This consists of a combination of resin or balsam derived from any source, mixed with caustic lime or other caustic alkaline earth. With this any acid contained in the resin combines. To these ingredients are added linseed-oil and sulphur. A good result is obtained as follows: Take, by weight, five parts of the mixture of resin and caustic lime, the latter being in sufficient proportion to neutralize the free acid of the resin. Dissolve in eight parts of oil, preferably boiled linseed-oil. Add to this mixture a second composed of eight parts sulphur in forty-two parts linseed-oil. To this compound add twenty parts of sulphur and heat the mass to 375° Fahrenheit. When it begins to solidify, withdraw the heat and allow the mass to cool. Of course all the sulphur may be added at one time; but the mode of procedure above described produces the best results. I provide a backing or stiffening material of metal, wood, papier-maché, wood pulp, or felt fabric coated, indurated, or impregnated with adamanta or the described acid-proof material. I prefer to take a board, to which I apply an adherent layer of adamanta or the described material. Then cut this into the required lengths to form a box or cell. These lengths are screwed or clamped together. The surface coated with the adherent layer of acid-proof material makes an acid-proof joint.

The accompanying drawing illustrates my invention.

C is the backing or strengthening material, of wood, papier-maché, or other material. This is preferably taken in the form of a board and coated, indurated, or impregnated with an insulating acid-proof material, $a$, consisting of resin, a caustic alkaline earth, oil, and sulphur, as above described. Other ingredients may be added; but the commercial article called "adamanta," containing the described ingredients, is very effective. The board or backing so prepared is then cut into the requisite form and size to form the required cell, as shown. The parts are screwed or clamped together. The meeting surfaces thus prepared form a water and acid proof joint, as $j$. A cover, B, of the same material is provided, having a central hole for the introduction of the electrolytic liquid and holes $h$ for the electrodes.

What I claim, and desire to secure by Letters Patent, is—

1. An inclosing-cell for a galvanic battery, lined, coated, impregnated, or rendered acid-proof by the application of a compound of a resin, a caustic alkaline earth, oil, and sulphur, substantially as described.

2. In an inclosing-cell for a galvanic battery, the combination of wood, papier-maché, or similar strengthening material and a water and acid proof material called "adamanta," substantially as described.

Signed at New York, in the county of New York and State of New York, this 31st day of March, A. D. 1887.

CAMILLE A. FAURE.

Witnesses:
WM. B. VANSIZE,
DANIEL E. DELAVAN.